United States Patent
Backhouse et al.

(10) Patent No.: US 10,053,007 B2
(45) Date of Patent: Aug. 21, 2018

(54) MOTOR VEHICLE COLLISION WARNING SYSTEM

(71) Applicant: Volvo Car Corporation, Gothenburg (SE)

(72) Inventors: Andrew Backhouse, Gothenburg (SE); Martin Magnusson, Kungalv (SE)

(73) Assignee: Volvo Car Corporation, Gothenburg (SE)

( * ) Notice: Subject to any disclaimer, the term of this patent is extended or adjusted under 35 U.S.C. 154(b) by 327 days.

(21) Appl. No.: 13/935,060

(22) Filed: Jul. 3, 2013

(65) Prior Publication Data
US 2014/0009276 A1 Jan. 9, 2014

(30) Foreign Application Priority Data
Jul. 3, 2012 (EP) .................... 12174690

(51) Int. Cl.
*B60Q 1/00* (2006.01)
*B60Q 9/00* (2006.01)
*B60W 50/00* (2006.01)
*B60W 50/14* (2012.01)
*B60W 30/095* (2012.01)
*B60W 40/08* (2012.01)

(52) U.S. Cl.
CPC ........... *B60Q 9/008* (2013.01); *B60W 30/095* (2013.01); *B60W 40/08* (2013.01); *B60W 50/0098* (2013.01); *B60W 50/14* (2013.01); *B60W 2050/0075* (2013.01)

(58) Field of Classification Search
None
See application file for complete search history.

(56) References Cited

U.S. PATENT DOCUMENTS

| | | | |
|---|---|---|---|
| 6,756,916 | B2 | 6/2004 | Yanai |
| 6,948,082 | B2 | 9/2005 | Gschwind et al. |
| 8,781,688 | B2 | 7/2014 | Sandblom |
| 2003/0217297 | A1* | 11/2003 | Gschwind et al. ........... 713/300 |
| 2006/0271258 | A1 | 11/2006 | Salmeen et al. |

(Continued)

FOREIGN PATENT DOCUMENTS

| | | |
|---|---|---|
| CN | 102292754 | 12/2011 |
| DE | 10346625 | 5/2005 |

(Continued)

OTHER PUBLICATIONS

Extended European Search Report, Completed by the European Patent Office dated Nov. 13, 2012, 6 Pages.

(Continued)

*Primary Examiner* — Brian Zimmerman
*Assistant Examiner* — Kevin Lau
(74) *Attorney, Agent, or Firm* — Brooks Kushman P.C.

(57) ABSTRACT

A motor vehicle collision warning system is described, as well as an automotive vehicle including such a motor vehicle collision warning system. The motor vehicle collision warning system is adapted for analyzing an unwound amount of a driver safety belt and adding an additional distracted reaction time to a pre-set driver reaction time based on the analysis of the unwound amount of the driver safety in order to provide a collision warning earlier than a collision warning based on the pre-set driver reaction time when a driver is determined as being distracted.

18 Claims, 2 Drawing Sheets

(56) References Cited

U.S. PATENT DOCUMENTS

| | | | |
|---|---|---|---|
| 2007/0273139 A1 | 11/2007 | Kuttenberger et al. | |
| 2009/0037104 A1 | 2/2009 | Basson et al. | |
| 2010/0222976 A1* | 9/2010 | Haug ............................ | 701/70 |
| 2012/0101689 A1* | 4/2012 | Schramm ...................... | 701/45 |
| 2012/0176232 A1* | 7/2012 | Bantz .................... | G07C 5/008 |
| | | | 340/439 |

FOREIGN PATENT DOCUMENTS

| | | |
|---|---|---|
| EP | 1233390 | 8/2002 |
| JP | 10236276 | 9/1998 |
| JP | 2002240659 | 8/2002 |
| WO | WO 2010053410 A1 * | 5/2010 |

OTHER PUBLICATIONS

English translation to Chinese Office Action attached to original Chinese Office Action for Chinese Application No. CN 201310268479.2, Completed by the Chinese Patent Office, dated Sep. 5, 2016, All together.

* cited by examiner

MOTOR VEHICLE COLLISION WARNING SYSTEM

CROSS-REFERENCE TO RELATED APPLICATIONS

This application claims priority to European Patent Application No. 12174690.3 filed Jul. 3, 2012, the disclosure of which is incorporated in its entirety by reference herein.

TECHNICAL FIELD

Embodiments herein relate to a motor vehicle collision warning system as well as an automotive vehicle comprising such a motor vehicle collision warning system.

BACKGROUND

Motor vehicle collision warning systems are becoming more and more common in today's vehicles. These systems are usually arranged to monitor the surroundings of a hosting vehicle and alert a driver thereof of potentially dangerous traffic situations. In order to provide a collision warning a sufficient time ahead of a detected potentially dangerous traffic situation these systems usually rely on a pre-set driver reaction time, i.e. a pre-set time during which an average alert driver would be able to react to an upcoming threat. Thus, a warning is issued this pre-set time ahead of e.g. a predicted collision impact.

However, a driver of a vehicle may from time to time become distracted and thus unfocused. This may be due to a number of different reasons. One such reason may be that the driver is out of an appropriate driving position. The reason here fore may be that the driver is picking something, e.g. sunglasses, from a glove compartment, from the floor or from door pockets etc. The driver may also be attempting to check on or reach something placed in a rear seat or similar. Other reasons include the driver monitoring or caring for an infant or child placed in a child seat somewhere in the vehicle. Thus, all of the above reasons may cause a driver to stop putting full attention to monitoring the road and traffic situation ahead.

Such inattentiveness may, as a fairly secure traffic situation can worsen quite rapidly, cause a driver to be caught off-guard when a warning is issued. Consequently a situation which could have been handled quite comfortably by an average alert driver may turn into a potentially challenging situation for the distracted driver.

A previous attempt at including a state of mind of a vehicle occupant in a motor vehicle collision detection, warning, and countermeasure system is illustrated by document US 2006271258 A1. A controller therein performs a safety countermeasure in response to a determined state of mind of the vehicle occupant. A voice sensor is used to detect voice signals from the vehicle occupant. An occupant classifier is used to determine a state of mind of the vehicle occupant based on the voice signals, and a controller is arranged to perform the safety countermeasure in response to the determined state of mind. The safety countermeasure comprises transmitting the determined state of mind to at least one target vehicle.

SUMMARY

Embodiments herein aim to provide an improved motor vehicle collision warning system which allows for a certain degree of driver distraction whilst still allowing the driver to handle potentially dangerous situations in a controlled manner.

This is provided by a motor vehicle collision warning system comprising means for providing a collision warning ahead of a potentially dangerous traffic situation based on a pre-set driver reaction time, which further comprises means for determining driver distraction through analyzing an unwound amount of a driver safety belt, and means for adding an additional distracted reaction time to the pre-set driver reaction time based on the analysis of the unwound amount of the driver safety belt such that a warning is provided earlier in case a driver is determined as being distracted.

The provision of means for determining driver distraction through analyzing an unwound amount of a driver safety belt enables cost efficient determination of driver distraction. Hereby a driver may be provided additional time to handle otherwise potentially problematic situations.

According to a second aspect the means for determining driver distraction are arranged to perform a calibration for the determination based on a pre-determined time period of driver safety belt usage.

The provision of a calibration for the determination based on a pre-determined time period of driver safety belt usage, as described for the second aspect, enables seamless usage of the system by several different drivers as the system automatically will account for differently configured drivers.

According to a third aspect the means for determining driver distraction are arranged to perform a calibration for the determination through setting a driver safety belt unwinding threshold based on driver safety belt unwinding during a pre-determined time period of driver safety belt usage.

The provision of setting a driver safety belt unwinding threshold based on driver safety belt unwinding during a pre-determined time period of driver safety belt usage, as described for the third aspect, enables a simple and effective way to quantify normal and distracted driver seating positions.

According to a fourth aspect the means for determining driver distraction are arranged to perform a calibration for the determination through setting a driver safety belt unwinding threshold based on driver safety belt unwinding during a pre-determined time period of driver safety belt usage with driver hands detected on a steering wheel of the vehicle.

The provision of setting a driver safety belt unwinding threshold based on driver safety belt unwinding during a pre-determined time period of driver safety belt usage with driver hands detected on a steering wheel of the vehicle, as described for the fourth aspect, enables improved calibration of an un-distracted hands-on seating position of the driver.

According to a fifth aspect the means for determining driver distraction are arranged to perform a calibration for the determination through setting a driver safety belt unwinding threshold based on driver safety belt unwinding during a pre-determined time period of driver safety belt usage with a driver detected as seated in a normal position using a driver monitoring camera.

Setting a driver safety belt unwinding threshold based on driver safety belt unwinding during a pre-determined time period of driver safety belt usage with a driver detected as seated in a normal position using a driver monitoring camera, as described for the fifth aspect, provides for an alternative calibration of an un-distracted normal seating position of the driver.

According to a sixth aspect the means for determining driver distraction are arranged to perform a calibration for the determination through setting a driver safety belt unwinding threshold based on driver safety belt unwinding during a pre-determined time period of driver safety belt usage with a driver detected as seated in a normal position using driver seat integrated weight sensors.

Setting a driver safety belt unwinding threshold based on driver safety belt unwinding during a pre-determined time period of driver safety belt usage with a driver detected as seated in a normal position using driver seat integrated weight sensors, as described for the sixth aspect, provides for a further alternative calibration of an un-distracted normal seating position of the driver.

According to a seventh aspect it further comprises means for determining additional driver distraction through analyzing driver operation of a one or more on board infotainment systems, and means for adding a further additional distracted reaction time to the pre-set driver reaction time based on the analysis of the driver operation of a one or more on board infotainment systems such that a warning is provided still earlier in case a driver is determined as being distracted and determined as operating one or more on board infotainment systems.

The provision of means for adding a further additional distracted reaction time to the pre-set driver reaction time in case a driver is determined as being distracted and determined as using one or more on board infotainment systems, as described for the seventh aspect, enables the provision of yet some additional time to handle otherwise potentially problematic situations in situations where a driver is focused on the operation of one or more on board infotainment systems.

According to an eight aspect it further comprises means for performing automatic braking of the vehicle when a warning is provided, such that a driver determined as being distracted is provided still further time to handle an upcoming potentially dangerous traffic situation.

The provision of means for performing automatic braking of the vehicle when a warning is provided, as described for the eight aspect, provides for additional time for a driver to handle an upcoming potentially dangerous traffic situation as breaking increases the time that will pass until the vehicle reaches the upcoming potentially dangerous traffic situation.

According to a ninth aspect it further comprises means for re-activating means for providing the warning of the motor vehicle collision warning system if de-activated and the driver is determined as being distracted.

The provision of means for re-activating means for providing the warning of the motor vehicle collision warning system, as described for the ninth aspect, enables an automatic safety enhancement if a driver who has de-activated or muted the warning should become distracted.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DESCRIPTION OF EMBODIMENTS

Figure 1:
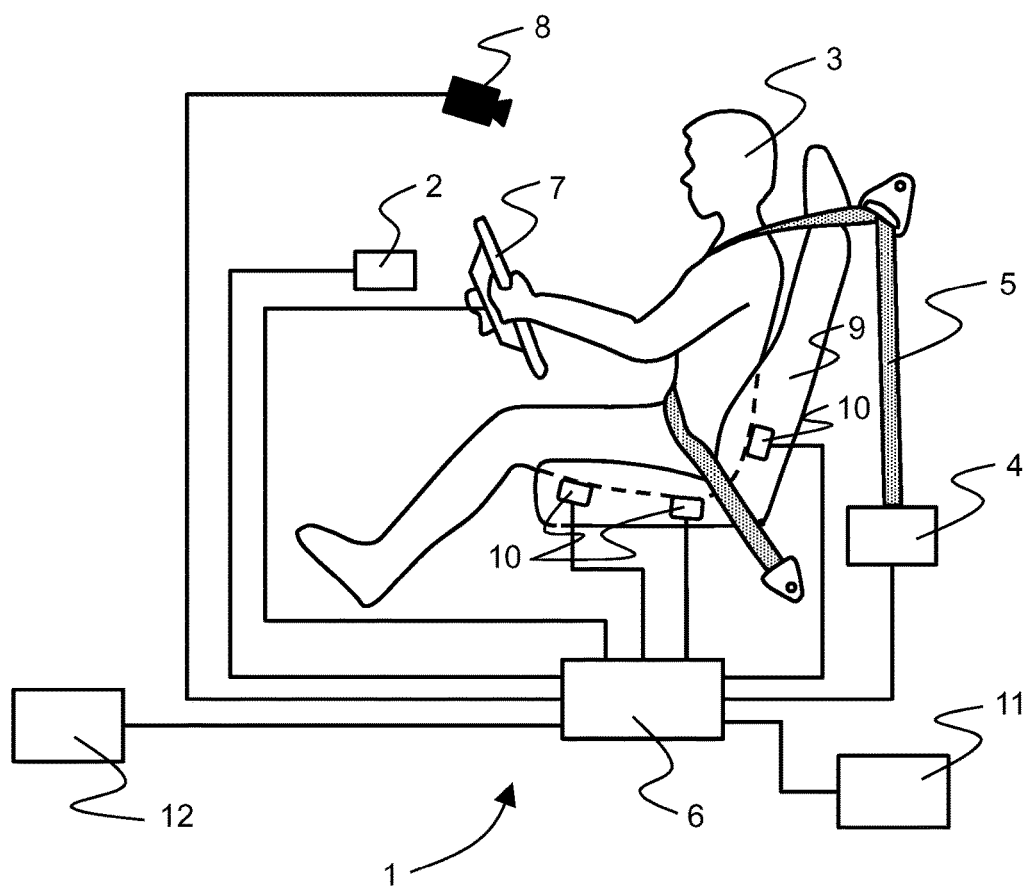
FIG. 1 is a schematic illustration of the motor vehicle collision warning system with a driver in an un-distracted normal driving position.

In overview, embodiments herein, as shown schematically in FIG. 1, relate to a motor vehicle collision warning system 1. Operations of the motor vehicle collision warning system 1 include providing a driver 3 of the vehicle knowledge and awareness of vehicles and objects that are within a close proximity of the host vehicle to prevent colliding with those vehicles and objects. Thus, the motor vehicle collision warning system 1 is able to sense a vehicle or an object within a close proximity of the host vehicle and warn the driver 3 of the host vehicle, such that the driver 3 can take precautionary steps to prevent or mitigate a collision or injury.

One or more collision sensors 12 are arranged to detect a high probability of a collision and send a signal to the motor vehicle collision warning system 1. The collision sensors may be based on technologies well known to the person skilled in the art, such as Radio Detection And Ranging (RADAR), Light Detection and Ranging (LIDAR), Light Amplification by Stimulated Emission of Radiation (LASER), Laser Detection and Ranging (LADAR) etc.

The motor vehicle collision warning system 1 comprises means 2 for providing a collision warning ahead of a potentially dangerous traffic situation based on a pre-set driver 3 reaction time. The pre-set driver 3 reaction time may be based on statistical data of vehicle driver reaction times. Although the term driver reaction time is used herein it is emphasized that this driver reaction time also may be selected such as to include sufficient driver action time, i.e. sufficient time for a vehicle driver to take measures, such as applying the brakes or steering, to handle a potential situation following an issued warning. The means 2 for providing a collision warning may be arranged to perform an acoustic and/or optical warning, such as sounding a warning signal and/or flashing a warning light or symbol.

Figure 2:
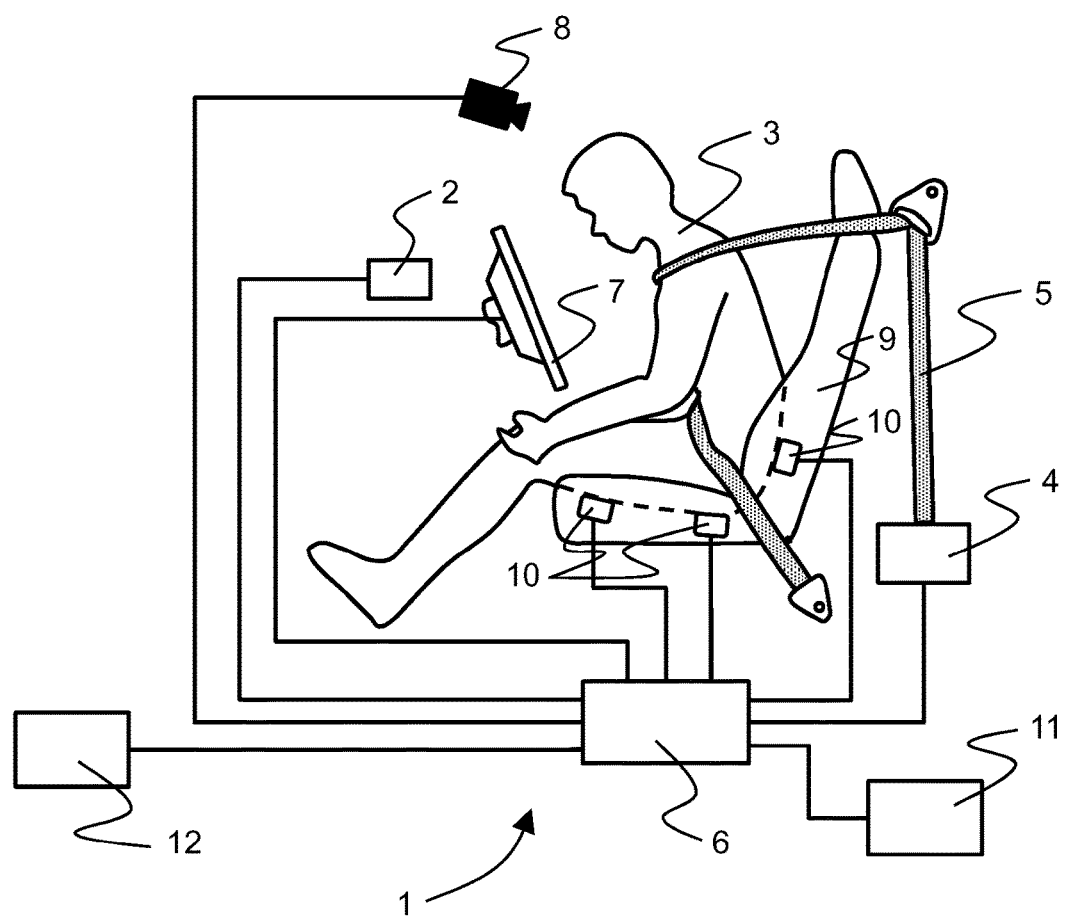
FIG. 2 is a schematic illustration of the motor vehicle collision warning system with a driver in a distracted position.

The motor vehicle collision warning system 1 comprises means 4, 6 for determining driver distraction through analyzing an unwound amount of a driver 3 safety belt 5. The means 4 may include seat belt status sensors (not shown) for determining a current unwound amount of a driver 3 safety belt 5 within the vehicle. The analysis of the unwound amount of a driver 3 safety belt 5 determined by the seat belt status sensors may be distributed between the seat belt status sensors and a processing unit 6. As shown in FIGS. 1 and 2, the processing unit may comprise any known hardware or hardware/software combination sufficient and appropriately configured or adapted for performing the operations and/or functions associated therewith as described herein, such as dedicated circuitry (e.g., a programmable device such as a programmable digital signal processor, or an appropriately programmed processor and associated memory for storing computer executable instructions).

Further, the processing unit 6 of the motor vehicle collision warning system 1 comprises means for adding an additional distracted reaction time to the pre-set driver 3 reaction time based on the analysis of the unwound amount of the driver 3 safety belt 5 such that a warning is provided earlier in case the driver 3 is determined as being distracted. The processing unit 6 may e.g. be arranged to calculate the pre-set driver 3 reaction time through calculating a nominal reaction time for the driver 3 and then adding some extra time, e.g. 300 ms, to allow for driver 3 reaction and action.

FIG. 2 illustrates the motor vehicle collision warning system 1 with a distracted driver 3. Distraction of the driver 3 being detectable as the driver 3 is seated in a position which has caused the driver 3 safety belt 5 to become substantially more unwound than when the driver 3 is seated in a normal attentive position in the driver seat 9.

In embodiments hereof the means 4, 6 for determining driver 3 distraction are arranged to perform a calibration for the determination based on a pre-determined time period of driver 3 safety belt 5 usage. The pre-determined time period is suitably an initial time period of driver 3 safety belt 5 usage during a new driving session of sufficient duration for performing a reliable calibration. The necessary duration may differ between installations and thus may need to be adapted to the specific type of installation.

According to further embodiments hereof the means 4, 6 for determining driver 3 distraction are arranged to perform a calibration for the determination through setting a driver 3 safety belt 5 unwinding threshold based on driver 3 safety belt 5 unwinding during a pre-determined time period of driver 3 safety belt 5 usage. Setting a driver 3 safety belt 5 unwinding threshold as described above provides a simple and effective way to separate between a driver 3 being seated normally and most likely undistracted in a driver seat 9 of the vehicle and a driver reaching towards some object or the like placed in a remote area of the vehicle interior, and thus probably distracted thereby.

According to still further alternative embodiments hereof the means 4, 6 for determining driver 3 distraction are arranged to perform a calibration for the determination through setting a driver 3 safety belt 5 unwinding threshold based on driver 3 safety belt 5 unwinding during a pre-determined time period of driver 3 safety belt 5 usage with driver 3 hands detected on a steering wheel 7 of the vehicle. Detection that the hands of a driver 3 are placed on the steering wheel 7 of the vehicle may be performed by sensors (not shown) e.g. arranged integrally at the steering wheel 7 or one or more sensors arranged to sense the torque at a steering column associated with the steering wheel 7. These hands-on sensors are arranged in communication with the processing unit 6 of the motor vehicle collision warning system 1. A driver 3 detected in a hands-on the steering wheel 7 seating position during the pre-determined time period of driver 3 safety belt 5 usage will be classified as un-distracted.

In yet further alternative embodiments hereof the means 4, 6 for determining driver 3 distraction are arranged to perform a calibration for the determination through setting a driver 3 safety belt 5 unwinding threshold based on driver 3 safety belt 5 unwinding during a pre-determined time period of driver 3 safety belt 5 usage with a driver 3 detected as seated in a normal position using a driver monitoring camera 8. Use of a driver monitoring camera 8 for the calibration process provides for a cost-efficient option in vehicles where such a driver monitoring camera 8 is already provided for other purposes. A driver 3 detected in a certain pre-determined seating position during the pre-determined time period of driver 3 safety belt 5 usage will be classified as un-distracted. The driver monitoring camera 8 is arranged in communication with the processing unit 6 of the motor vehicle collision warning system 1.

In yet still further alternative embodiments hereof the means 4, 6 for determining driver 3 distraction are arranged to perform a calibration for the determination through setting a driver 3 safety belt 5 unwinding threshold based on driver 3 safety belt 5 unwinding during a pre-determined time period of driver 3 safety belt 5 usage with a driver 3 detected as seated in a normal position using driver seat 9 integrated weight sensors 10. A driver 3 detected in a certain pre-determined seating position during the pre-determined time period of driver 3 safety belt 5 usage will be classified as un-distracted. The driver seat 9 integrated weight sensors 10 are arranged in communication with the processing unit 6 of the motor vehicle collision warning system 1. Any number of weight sensors 10 may be used, all of which may be located at various locations at the driver seat 9.

All the above embodiments may further comprise means, integral to the processing unit 6 or distributed, for determining additional driver 3 distraction through analyzing driver 3 operation of a one or more on board infotainment systems (not shown) and means, integral to the processing unit 6 or distributed, for adding a further additional distracted reaction time to the pre-set driver 3 reaction time. Hereby it is enabled that a warning is provided still earlier in case a driver 3 is determined as being distracted and determined as operating one or more on board infotainment systems. The driver 3 may e.g. be inserting a disc in a CD player or entering a destination in a navigation system or similar, and thus having a primary focus on that task. A driver 3 distracted in this way will benefit from the extra time provided by an earlier warning when it comes to the ability to handle a potentially dangerous traffic situation.

Additionally, all of the above embodiments may further comprise means 11 for performing automatic braking of the vehicle when a warning is provided, such that a driver 3 determined as being distracted is provided still further time to handle an upcoming potentially dangerous traffic situation. The means 11 for performing automatic braking of the vehicle may be integral to a braking system of the vehicle or arranged in communication therewith. The reduction of vehicle velocity provided through automatic braking of the vehicle will prolong an estimated "time-to-impact" of the motor vehicle collision warning system 1 and thus allow the driver some extra time to handle the upcoming potentially dangerous traffic situation.

The embodiments described above may further comprise means, integral to the processing unit 6 or distributed, for re-activating the means 2 for providing the warning of the motor vehicle collision warning system if these have been de-activated and the driver 3 is determined as being distracted. A driver 3 of the vehicle may in certain situations wish to deactivate the acoustic and/or optical warning provided by the means 2. However, as a traffic situation may worsen quite rapidly a distracted driver may benefit from a re-activated acoustic and/or optical warning in order to be able to better handle an upcoming potentially dangerous traffic situation of which the driver 3 was previously unaware.

In accordance with the present application is also envisaged an automotive vehicle comprising a motor vehicle collision warning system 1 as described above.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. A motor vehicle collision warning system comprising:
   means for providing a collision warning ahead of a potentially dangerous traffic situation based on a pre-set driver reaction time;
   means for determining driver distraction through analyzing an unwound amount of a driver safety belt;
   a processor and memory having stored computer executable instructions for adding an additional distracted reaction time to the pre-set driver reaction time based on the analysis of the unwound amount of the driver safety belt such that a warning is provided earlier in case a driver is determined as being distracted; and
   means for re-activating the means for providing the warning of the motor vehicle collision warning system if manually de-activated and the driver is determined as being distracted.

2. A motor vehicle collision warning system according to claim 1, wherein the means for determining driver distraction are arranged to perform a calibration for the determination through setting a driver safety belt unwinding threshold based on driver safety belt unwinding during a pre-determined time period of driver safety belt usage with driver hands detected on a steering wheel of the vehicle.

3. A motor vehicle collision warning system according to claim 1, wherein the means for determining driver distraction are arranged to perform a calibration for the determination through setting a driver safety belt unwinding threshold based on driver safety belt unwinding during a pre-determined time period of driver safety belt usage with a driver detected as seated in a normal position using a driver monitoring camera.

4. A motor vehicle collision warning system according to claim 1, wherein the means for determining driver distraction are arranged to perform a calibration for the determination through setting a driver safety belt unwinding threshold based on driver safety belt unwinding during a pre-determined time period of driver safety belt usage with a driver detected as seated in a normal position using driver seat integrated weight sensors.

5. A motor vehicle collision warning system according to claim 1 further comprising:
   means for determining additional driver distraction through analyzing driver operation of a one or more on board infotainment systems;
   wherein the processor is for adding a further additional distracted reaction time to the pre-set driver reaction time based on the analysis of the driver operation of a one or more on board infotainment systems such that a warning is provided still earlier in case a driver is determined as being distracted and determined as operating one or more on board infotainment systems.

6. A motor vehicle collision warning system according to claim 1 further comprising a braking system for performing automatic braking of the vehicle when a warning is provided, such that a driver determined as being distracted is provided still further time to handle an upcoming potentially dangerous traffic situation.

7. An automotive vehicle comprising a motor vehicle collision warning system according to claim 1.

8. A motor vehicle collision warning system comprising a processing unit including a processor and memory having stored computer executable instructions for analyzing an unwound amount of a driver safety belt and adding an additional distracted reaction time to a pre-set driver reaction time based on the analysis in order to provide a collision warning earlier than a collision warning based on the pre-set driver reaction time when a driver is determined as being distracted, wherein the processing unit is further arranged for re-activating the acoustic and/or optical device for providing the warning of the motor vehicle collision warning system if manually de-activated and the driver is determined as being distracted.

9. A motor vehicle collision warning system according to claim 8 further comprising an acoustic and/or optical device for providing the collision warning ahead of a potentially dangerous traffic situation.

10. A motor vehicle collision warning system according to claim 8, wherein the processing unit is arranged to perform a calibration for use in determining driver distraction through setting a driver safety belt unwinding threshold based on driver safety belt unwinding during a pre-determined time period of driver safety belt usage with driver hands detected on a steering wheel of the vehicle.

11. A motor vehicle collision warning system according to claim 8, wherein the processing unit is arranged to perform a calibration for use in determining driver distraction through setting a driver safety belt unwinding threshold based on driver safety belt unwinding during a pre-determined time period of driver safety belt usage with a driver detected as seated in a normal position using a driver monitoring camera.

12. A motor vehicle collision warning system according to claim 8, wherein the processing unit is arranged to perform a calibration for use in determining driver distraction through setting a driver safety belt unwinding threshold based on driver safety belt unwinding during a pre-determined time period of driver safety belt usage with a driver detected as seated in a normal position using driver seat integrated weight sensors.

13. A motor vehicle collision warning system according to claim 8, wherein the processing unit is further arranged for determining driver distraction through analyzing driver operation of a one or more on board infotainment systems, and for adding a further additional distracted reaction time to the pre-set driver reaction time based on the analysis of the driver operation of a one or more on board infotainment systems such that a warning is provided still earlier in case a driver is determined as being distracted and determined as operating one or more on board infotainment systems.

14. A motor vehicle collision warning system according to claim 8, wherein the processing unit is further arranged for use in performing automatic braking of the vehicle when a warning is provided, such that a driver determined as being distracted is provided still further time to handle an upcoming potentially dangerous traffic situation.

15. A motor vehicle collision warning system according to claim 1, wherein the means for determining driver distraction are arranged to perform an initial calibration for the determination based on a pre-determined time period of driver safety belt usage.

16. A motor vehicle collision warning system according to claim 8, wherein the processing unit is arranged to perform an initial calibration for use in determining driver distraction based on a pre-determined time period of driver safety belt usage.

17. A motor vehicle collision warning system according to claim 15, wherein the means for determining driver distraction are arranged to perform a calibration for the determination through setting a driver safety belt unwinding threshold based on driver safety belt unwinding during a pre-determined time period of driver safety belt usage.

18. A motor vehicle collision warning system according to claim 16, wherein the processing unit is arranged to perform a calibration for use in determining driver distraction through setting a driver safety belt unwinding threshold based on driver safety belt unwinding during a pre-determined time period of driver safety belt usage with driver hands detected on a steering wheel of the vehicle.

\* \* \* \* \*